(12) United States Patent
Das et al.

(10) Patent No.: US 9,185,614 B2
(45) Date of Patent: Nov. 10, 2015

(54) COMPUTATION OF MEASUREMENT METRICS FOR WIRELESS NETWORKS

(71) Applicant: QUALCOMM Incorporated, San Diego, CA (US)

(72) Inventors: Sibasish Das, San Diego, CA (US); Shivratna Giri Srinivasan, San Diego, CA (US); Supratik Bhattacharjee, San Diego, CA (US); Brian Clarke Banister, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 201 days.

(21) Appl. No.: 13/671,017

(22) Filed: Nov. 7, 2012

(65) Prior Publication Data

US 2013/0121187 A1   May 16, 2013

Related U.S. Application Data

(60) Provisional application No. 61/558,337, filed on Nov. 10, 2011.

(51) Int. Cl.
*H04L 12/26* (2006.01)
*H04W 36/00* (2009.01)
*H04B 17/309* (2015.01)
*H04B 17/318* (2015.01)
*H04W 24/10* (2009.01)

(52) U.S. Cl.
CPC ......... *H04W 36/0083* (2013.01); *H04B 17/309* (2015.01); *H04B 17/318* (2015.01); *H04W 24/10* (2013.01); *H04W 36/0088* (2013.01)

(58) Field of Classification Search
None
See application file for complete search history.

(56) References Cited

U.S. PATENT DOCUMENTS 6,907,092 B1 * 6/2005 Yakhnich et al. ... H04L 25/0216
                                                    375/346
7,366,137 B2 * 4/2008 Abrishamkar et al. ....... 370/332
(Continued)

FOREIGN PATENT DOCUMENTS

WO   WO 2009/095368 A1 * 8/2009 ............. H04B 17/00
WO   WO-2009095368 A1   8/2009
(Continued)

OTHER PUBLICATIONS

Tomasi, Electronic Communication Systems Fundamentals Through Advanced, Mar. 28, 2003 , Pearson Prentice Hall, Fifth Edition, p. 716, lines 1-5 & equation (17-2), and lines 11-12 & equation (17-3).*
(Continued)

*Primary Examiner* — Timothy J Weidner
*Assistant Examiner* — Jana Blust
(74) *Attorney, Agent, or Firm* — Patterson & Sheridan, LLP

(57) ABSTRACT

Methods and apparatus for computing measurement metrics in a wireless communications network are provided. One example method generally includes obtaining a channel impulse response (CIR) from one or more reference signals (RSs) transmitted from one or more antennas of a base station (BS); calculating an absolute square per element of the CIR to generate channel energy response (CER) elements; calculating a threshold value based on a noise variance estimated from a portion of the CER elements; selecting CER elements that exceed the threshold value; and computing a reference signal received power (RSRP) value based on the selected CER elements.

26 Claims, 6 Drawing Sheets

(56) References Cited

U.S. PATENT DOCUMENTS

| | | | | |
|---|---|---|---|---|
| 7,388,900 | B2* | 6/2008 | Wang | 375/150 |
| 7,675,962 | B2* | 3/2010 | Mergen et al. | H04L 25/0216 375/147 |
| 8,031,787 | B2* | 10/2011 | Fechtel et al. | H04L 25/0212 375/260 |
| 8,229,708 | B2 | 7/2012 | Mantravadi et al. | |
| 8,284,875 | B2* | 10/2012 | Park et al. | 375/341 |
| 8,582,703 | B2* | 11/2013 | Luschi et al. | 375/346 |
| 8,634,487 | B2* | 1/2014 | Kent et al. | 375/260 |
| 8,718,210 | B2* | 5/2014 | Motamed et al. | 375/346 |
| 8,942,696 | B2* | 1/2015 | Vukajlovic Kenehan et al. | H04B 17/24 343/853 |
| 2005/0255815 | A1* | 11/2005 | Hammerschmidt et al. | H03G 3/3078 455/132 |
| 2005/0259766 | A1* | 11/2005 | Chen | 375/341 |
| 2009/0197555 | A1* | 8/2009 | Lindoff et al. | H04L 5/0007 455/226.2 |
| 2009/0316842 | A1* | 12/2009 | Lu et al. | 375/346 |
| 2009/0323843 | A1* | 12/2009 | Yang et al. | 375/260 |
| 2010/0002785 | A1* | 1/2010 | Mantravadi et al. | 375/260 |
| 2010/0172423 | A1* | 7/2010 | Chrabieh | 375/260 |
| 2010/0309797 | A1* | 12/2010 | Lindoff et al. | 370/252 |
| 2011/0007657 | A1* | 1/2011 | Kazmi et al. | 370/252 |
| 2011/0026619 | A1* | 2/2011 | Kent et al. | 375/260 |
| 2011/0026652 | A1* | 2/2011 | Kent et al. | 375/346 |
| 2011/0149943 | A1* | 6/2011 | Srinivasan et al. | 370/343 |
| 2011/0151919 | A1* | 6/2011 | Shin | H04W 24/00 455/525 |
| 2012/0115463 | A1* | 5/2012 | Weng et al. | 455/425 |
| 2012/0120945 | A1 | 5/2012 | Alexander et al. | |
| 2012/0238272 | A1* | 9/2012 | Hwang et al. | 455/436 |
| 2012/0320773 | A1* | 12/2012 | Toufik et al. | 370/252 |
| 2013/0121188 | A1* | 5/2013 | Das et al. | H04W 56/00 370/252 |
| 2013/0122841 | A1* | 5/2013 | Srinivasan et al. | 455/226.2 |
| 2013/0196603 | A1* | 8/2013 | Gheorghiu et al. | 455/67.11 |
| 2013/0223256 | A1* | 8/2013 | Choi et al. | 370/252 |
| 2013/0267221 | A1* | 10/2013 | Srinivasan et al. | 455/422.1 |
| 2014/0003557 | A1* | 1/2014 | Wu et al. | 375/343 |
| 2014/0112178 | A1* | 4/2014 | Gunnarsson et al. | 370/252 |

FOREIGN PATENT DOCUMENTS

| | | | | |
|---|---|---|---|---|
| WO | WO 2010/062238 | * | 6/2010 | H04B 17/00 |
| WO | WO-2010062238 A1 | | 6/2010 | |

OTHER PUBLICATIONS

LTE; Evolved Universal Terrestrial Radio Radio Access (E-UTRA); Physical Layer; Measurements (3GPP TS 36.214 version 10.1.0 Release 10), Technical Specification, European Telecommunications Standards Institute (ETSI), vol. 3GPP RAN1, No. V10.1.0, Apr. 1, 2011.*

Etzkorn, "Data Normalization and Standardization", published Nov. 6, 2011, http://www.benetzkorn.com/2011/11/data-normalization-and-standardization/.*

Lyons, "Section 11.1-Coherent Averaging", Understanding Digital Signal Processing, $2^{nd}$ ed., publlished Mar. 15, 2004, Prentice Hall PTR, http://flylib.com/books/en/2.729.1.107/1/.*

LTE; Evolved Universal Terrestrial Radio Access (E-UTRA); Physical layer; Measurements (3GPP TS 36.214 version 10.1.0 Release 10), Technical Specification, European Telecommunications Standards Institute (ETSI), 650, Route Des Lucioles ; F-06921 Sophia-Antipolis ; France, vol. 3GPP Ran 1, No. V10.1.0, Apr. 1, 2011, XP014065361.

* cited by examiner

COMPUTATION OF MEASUREMENT METRICS FOR WIRELESS NETWORKS

CROSS-REFERENCE TO RELATED APPLICATIONS

This application claims benefit of U.S. Provisional Patent Application Ser. No. 61/558,337, entitled "Computation of Measurement Metrics for Wireless Networks" and filed Nov. 10, 2011, which is herein incorporated by reference.

BACKGROUND

I. Field

Certain aspects of the present disclosure generally relate to wireless communications and, more specifically, to computation of measurement metrics for wireless networks.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipment devices (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

In an aspect of the disclosure, a method for wireless communications is provided. The method generally includes obtaining a channel impulse response (CIR) from one or more reference signals (RSs) transmitted from one or more antennas of a base station (BS), calculating an absolute square per element of the CIR to generate channel energy response (CER) elements, calculating a threshold value based on a noise variance estimated from a portion of the CER elements, selecting CER elements that exceed the threshold value, and computing a reference signal received power (RSRP) value based on the selected CER elements.

In an aspect of the disclosure, an apparatus for wireless communications is provided. The apparatus generally includes means for obtaining a CIR from one or more RSs transmitted from one or more antennas of a BS, means for calculating an absolute square per element of the CIR to generate CER elements, means for calculating a threshold value based on a noise variance estimated from a portion of the CER elements, means for selecting CER elements that exceed the threshold value, and means for computing an RSRP value based on the selected CER elements.

In an aspect of the disclosure, an apparatus for wireless communications is provided. The apparatus generally includes at least one processor and a memory coupled to the at least one processor. The at least one processor is typically configured to obtain a CIR from one or more RSs transmitted from one or more antennas of a BS, to calculate an absolute square per element of the CIR to generate CER elements, to calculate a threshold value based on a noise variance estimated from a portion of the CER elements, to select CER elements that exceed the threshold value, and to compute an RSRP value based on the selected CER elements.

In an aspect of the disclosure, a computer program product comprising a computer-readable medium having instructions stored thereon is provided. The instructions are generally executable by one or more processors for obtaining a CIR from one or more RSs transmitted from one or more antennas of a BS, for calculating an absolute square per element of the CIR to generate CER elements, for calculating a threshold value based on a noise variance estimated from a portion of the CER elements, for selecting CER elements that exceed the threshold value, and for computing an RSRP value based on the selected CER elements.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
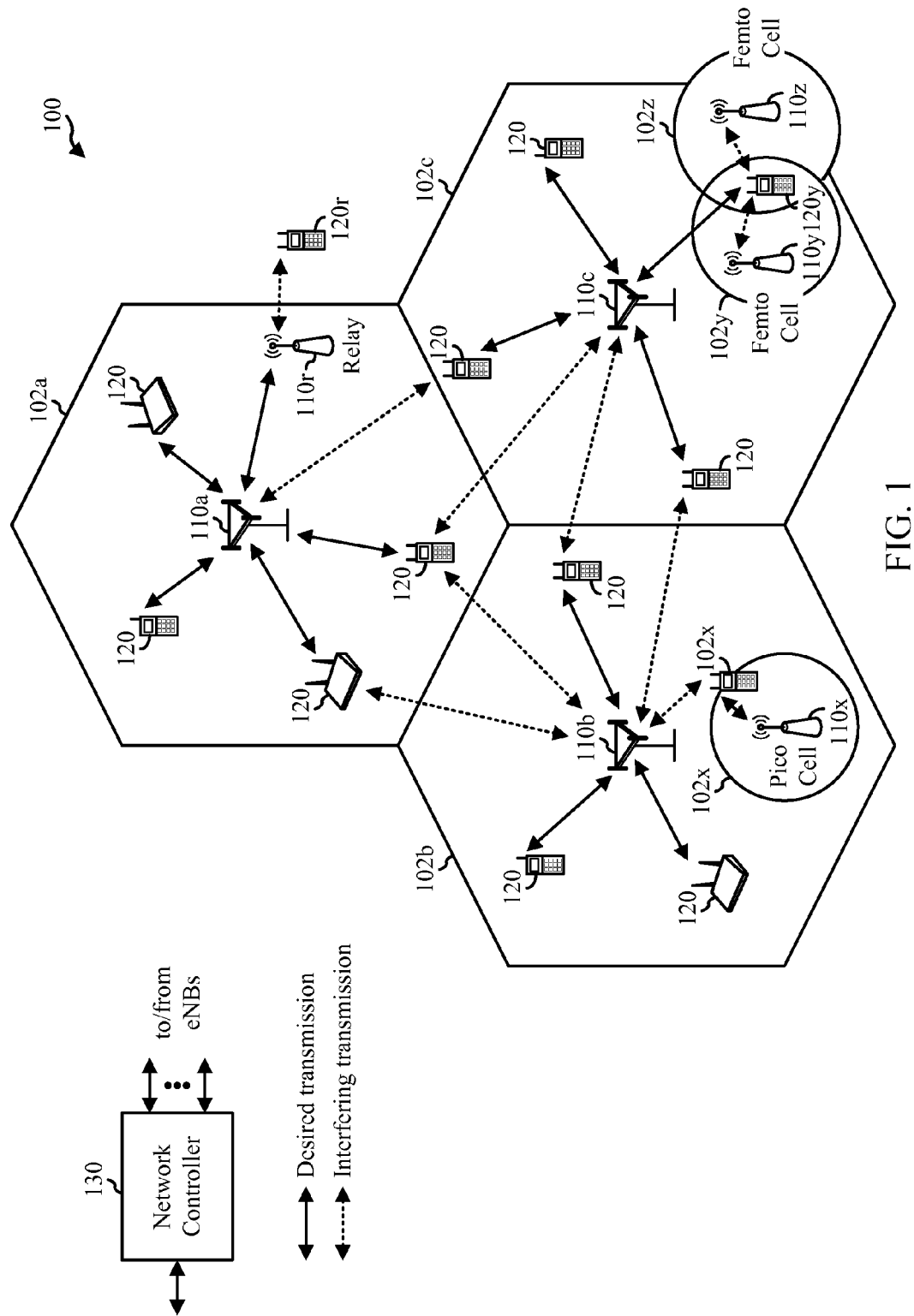
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station (BS), a Node B, an access point (AP), etc. Each eNB 110 may provide communication coverage for a particular geographic area. The term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
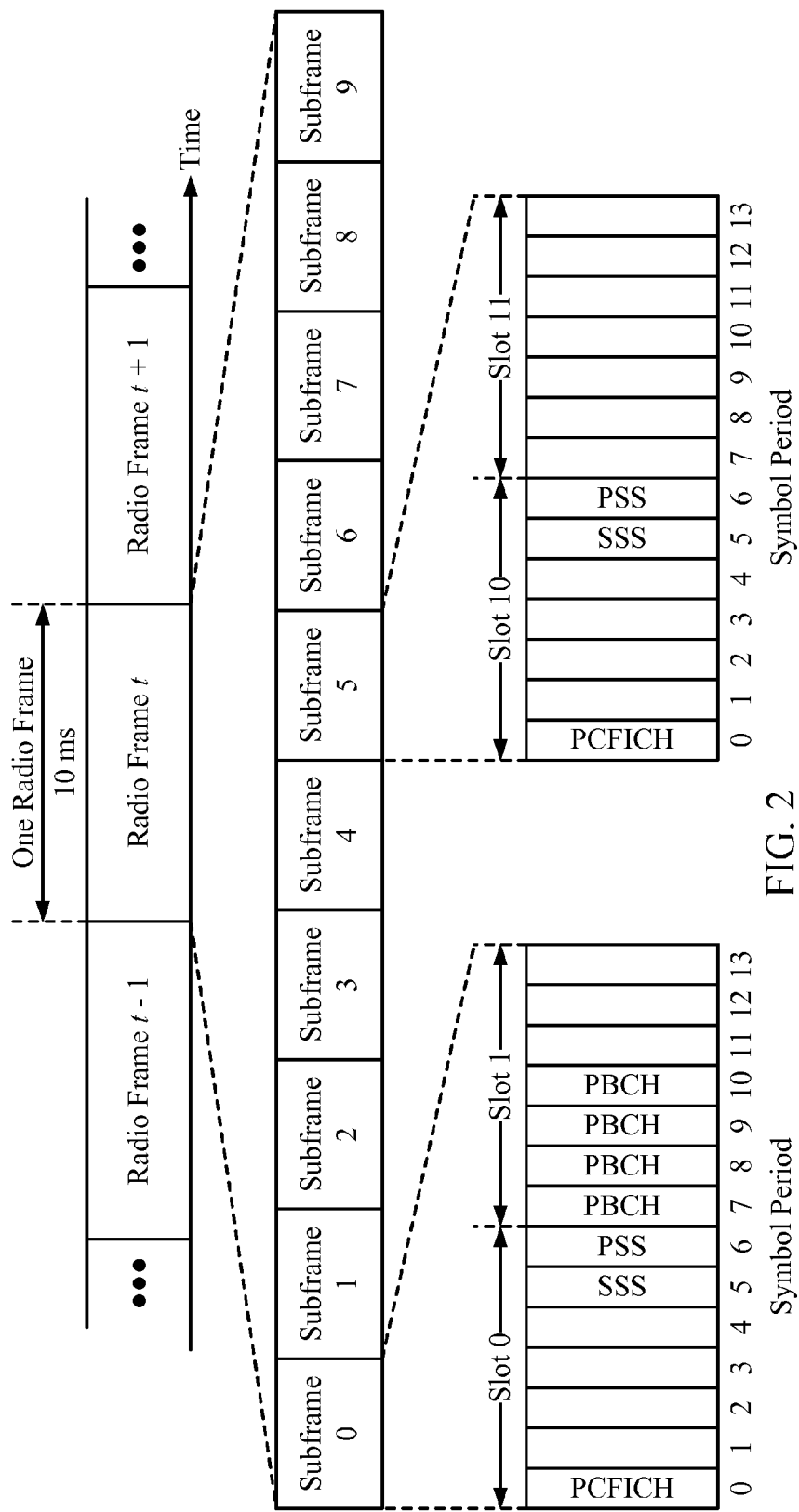
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP), as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
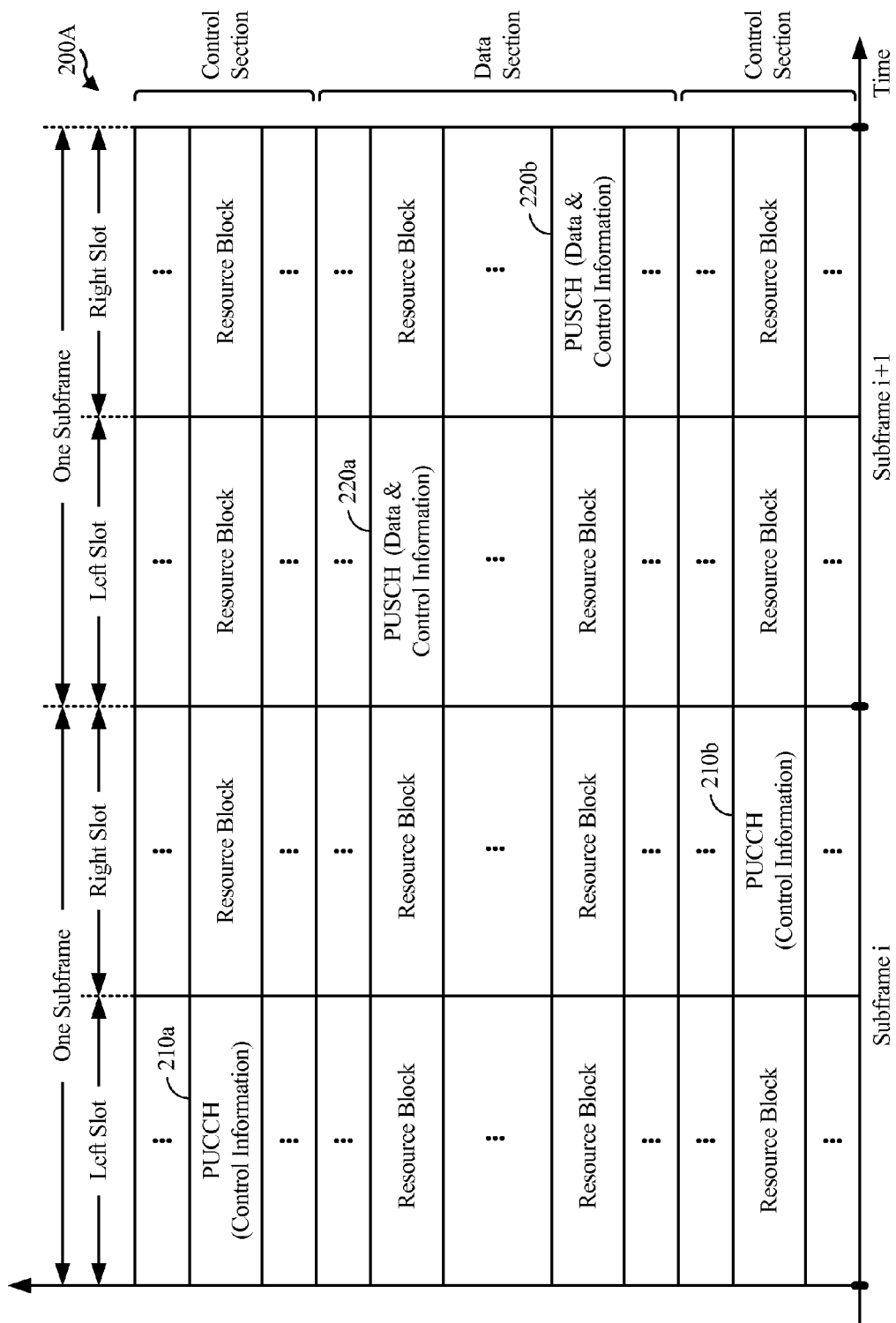
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the Node B. The UE may transmit control information in a Physical Uplink Control Channel (PUCCH) 210a, 210b on the assigned resource blocks in the control section. The UE may transmit data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, path loss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1). UE 120y may then observe high interference from femto eNB 110y on the downlink and may also cause high interference to eNB 110y on the uplink.

A dominant interference scenario may also occur due to range extension, which is a scenario in which a UE connects to an eNB with lower path loss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the path loss for eNB 110x is lower than the path loss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the relative received power of signals from the eNB received at a UE (and not based on the transmit power level of the eNB).

Figure 3:
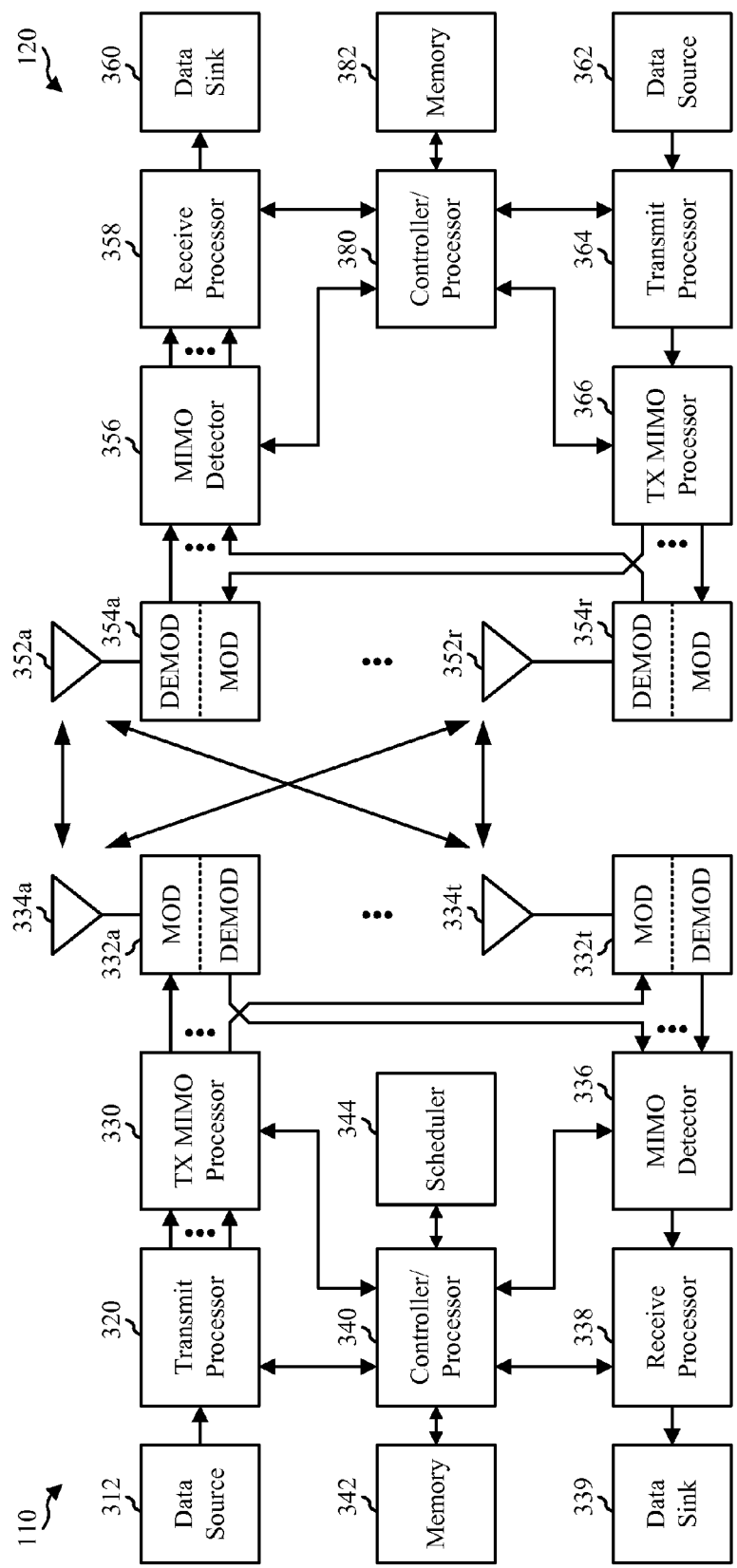
FIG. 3 shows a block diagram conceptually illustrating an example of a Node B in communication with a user equipment device (UE) in a wireless communications network in accordance with certain aspects of the present disclosure.

FIG. 3 shows a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by modulators 354a through 354r (e.g., for SC-FDM, etc.), and transmitted to the eNB 110. At the eNB 110, the uplink signals from the UE 120 may be received by antennas 334, processed by demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340, 380 may direct the operation at the eNB 110 and the UE 120, respectively. The controller/processor 380 and/or other processors and modules at the UE 120 may perform or direct operations for blocks 400 in FIG. 4 and/or other processes for the techniques described herein. The memory 382 may store data and program codes for UE 120. A scheduler 344 may schedule UEs for data transmission on the downlink and/or uplink.

Example Computation of Measurement Metrics

In wireless networks, such as LTE-based wireless networks, a UE may be configured to perform various measurements and report those measurements back to a serving base station. The base station may use these measurement reports to make decisions, for example, regarding handing the UE over to a base station that may be more suitable to serve the UE.

For example, 3GPP specification TS 36.214 defines the following measurement metrics: reference signal received power (RSRP) for the serving LTE cell and for neighboring LTE cells, received signal strength indicator (RSSI), and reference signal received quality (RSRQ) for the serving LTE cell and neighboring LTE cells. Providing a cell-specific signal strength metric, RSRP is primarily used to rank different LTE cells according to their signal strength as an input for cell reselection and handover decisions. The RSSI may be defined as the total received wideband power observed by a UE from all sources, including serving and non-serving cells, adjacent channel interference, and thermal noise within the measurement bandwidth. Like RSRP, RSRQ is a cell-specific signal quality metric and may be used, for example, in scenarios for which RSRP measurements do not provide sufficient information to perform reliable mobility decisions. While RSRP is an indicator of the wanted signal strength, RSRQ additionally takes the interference level into account due to the inclusion of RSSI in RSRQ's computation.

While such standards (or amendments to or releases of the standards) may define what types of metrics are to be measured, such standards may not specify exactly how to compute such metrics. Particularly in advanced networks that utilize multiple subbands and/or multiple transmit and receive antenna pairs, there may be multiple options for how to compute a metric given the corresponding combinations of signals measured.

Certain aspects of the present disclosure provide techniques and apparatus that may be used to perform computations of various measurements metrics, such as RSRP for a serving cell (e.g., a serving LTE cell), RSRP for one or more neighbor cells, RSSI, and/or RSRQ.

Example Computation of RSRP for Serving Cell

For the computation of RSRP for a serving cell, a UE may perform the steps described below. A software (SW) application (e.g., executing on an application processor) may issue a serving measurements request. The frequency of such a request may vary depending on an operating state. For example, such a request may be issued once every 40 ms when in connected mode and/or once every discontinuous reception (DRX) cycle in idle mode.

According to certain aspects, firmware (FW) may use an absolute square of taps of the wideband (WB) coherently-filtered channel impulse response (CIR) as input. This may be referred to as a channel energy response (CER). According to certain aspects, the CER may be summed across transmit (Tx) antennas for each receive (Rx) antenna.

A noise variance may be estimated. According to certain aspects, FW may average the CER taps outside the cyclic prefix (CP) to form a noise variance estimate.

Certain values of the CER above a threshold calculated using the noise threshold may then be selected. For example, FW may select the taps of the CER that are larger than a threshold calculated using the calculated noise variance estimate.

In some cases, FW may compute the signal power in the linear scale by accumulating the selected CER tap powers, and normalizing by the number of Tx antennas, and number of reference signal (RS) tones.

RSRP may be computed in units of dBm per Rx antenna by normalizing based on the digital variable gain amplifier (DVGA) gain and a conversion factor (e.g., from LSB^2 to mW).

Example Computation of RSRP for Neighboring Cells

For the computation of RSRP for one or more neighbor cells, a UE may perform the steps described below. An application (e.g., SW) may issue a neighbor measurements request. As with the serving cell computation, the frequency of this request may vary, for example, once every 160 ms when in connected mode, and once every wake-up to decode pages when in idle mode. The cell identifiers (IDs) (e.g., physical cell identifiers (PCIs)) indicated in this request may be measured for some period of time, for example, for the next 160 ms for connected mode, and for the next 10 ms for idle mode.

FW may obtain a neighbor CER from hardware (HW), for example, every 5 ms, computed using 1 ms worth of RS symbols. According to certain aspects, this channel estimation may use the RS tones in the center 6 resource blocks (RBs) in eNB transmissions. The channel estimates corresponding to the two OFDM symbols with RS tones in each slot are averaged coherently (as complex numbers). The coherently combined channel estimates for the two slots in every sub-frame may be combined non-coherently (in energy domain). The FW may use an absolute square of each tap of the neighbor CER—referred to herein as the neighbor CER, for each combination of Tx and Rx antenna.

A noise variance estimate may be calculated for each neighbor CER for each combination of Tx and Rx antenna. This may be used to select taps above a computed noise threshold. These steps are similar to those described above with reference to the serving cell RSRP computation. The taps below the noise threshold in the CER may be defaulted to zero to yield a thresholded neighbor CER.

The thresholded neighbor CERs may be averaged over time. For example, the thresholded neighbor CERs may be averaged eight times every 40 ms in connected mode and twice every 10 ms in idle mode to yield an accumulated CER.

A final noise thresholding may be performed on the accumulated CER, and the tap powers may be summed to obtain the RS power in a linear scale. The RSRP in dBm may be obtained by normalizing the RS power in linear scale by a low noise amplifier (LNA) and DVGA gains and subsequently applying the conversion factor from LSB to mW.

This resulting RSRP may be fed, for example, as input to a higher layer (e.g., Layer 3 (L3), or the network layer, of the Open Systems Interconnection (OSI) model) filtering algorithm in SW, for example, every 40 ms in connected mode.

Example RSSI Computation

A UE may perform the following steps to compute RSSI for a serving cell (e.g., a serving LTE cell). SW may issue a serving measurements request (e.g., once every 40 ms). FW may utilize the (in-band) wideband powers from HW, for example, for the 4 RS OFDM symbols per subframe (SF) and may filter them to obtain the filtered RSSI. For example, the filtering may be performed using an infinite impulse response (IIR) filter with a time constant of 1 ms.

Example RSRQ Computation

Various values may be computed using calculated RSRP and RSSI. For example, the following formulae may be used to compute the RSRQ for the serving and neighbor cells:

$RSRQ_{serving\text{-}cell} = RSRP_{serving\text{-}cell} + 10 \log_{10}(\text{Number of RBs in downlink}) - RSSI_{serving\text{-}cell}$ $RSRQ_{neighbor\text{-}cell} = RSRP_{neighbor\text{-}cell} + 10 \log_{10}(\text{Number of RBs used for neighbor measurements}) - RSSI_{neighbor\text{-}cell}$ In these formulae, $RSRP_{serving\text{-}cell}$ and $RSRP_{neighbor\text{-}cell}$ may be computed following steps in the sections above entitled "Example computation of RSRP for serving cell" and "Example computation of RSRP for neighboring cells," respectively. Additionally $RSSI_{serving\text{-}cell}$ and $RSSI_{neighbor\text{-}cell}$ may be computed as described above in the section entitled "Example RSSI computation."

Figure 4:
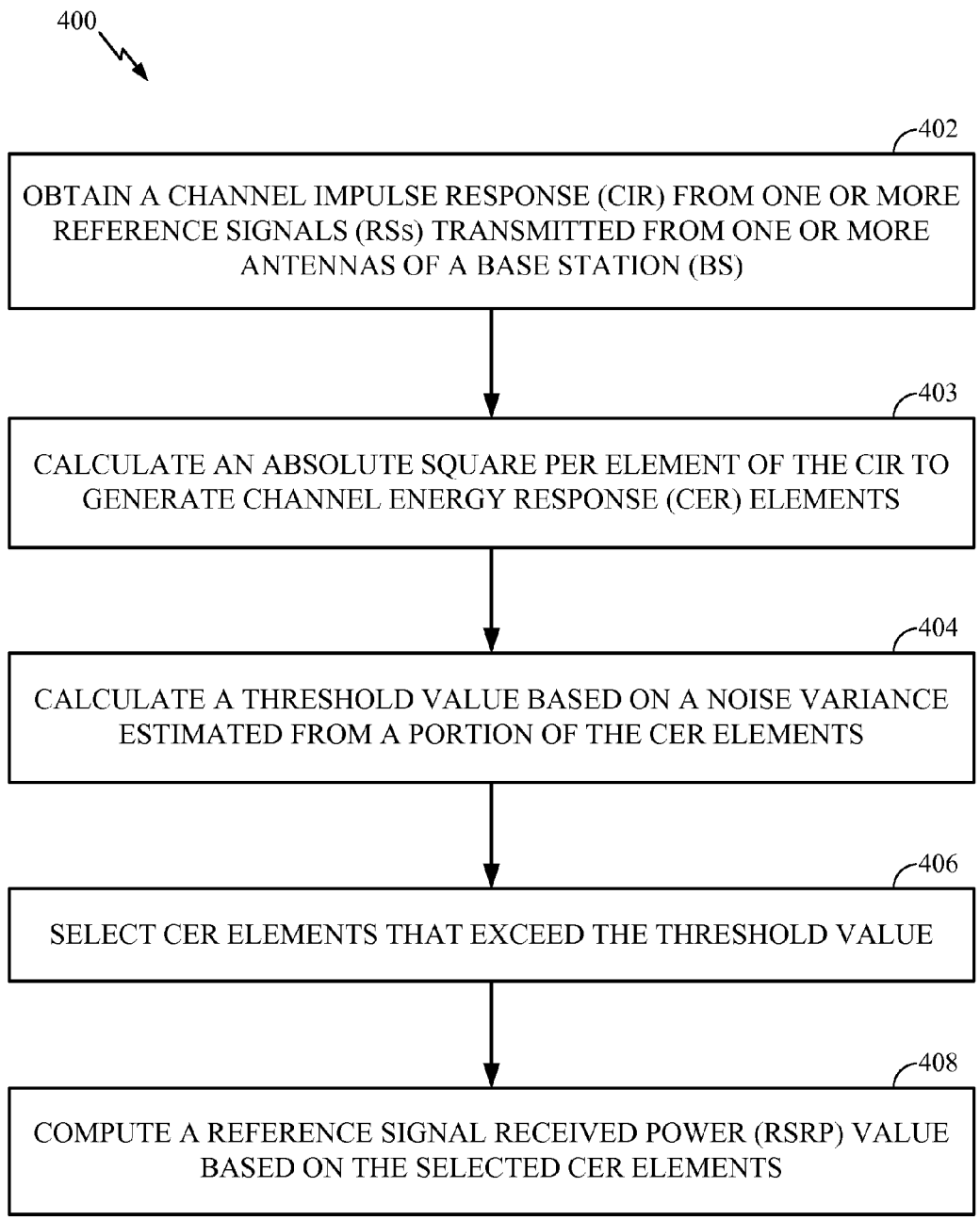
FIG. 4 is a flow diagram of example blocks executed to compute a measurement metric, from the perspective of a UE, in accordance with certain aspects of the present disclosure.

FIG. 4 is a flow diagram of example blocks 400 executed to determine, from the perspective of an apparatus (e.g., a UE), a reference signal receive power (RSRP) measurement, in accordance with certain aspects of the present disclosure. Operations illustrated by the blocks 400 may be executed, for example, at the antennas 352a-352r, demodulators 354a-354r, and processor(s) 358 and/or 380 of the UE 120 from FIG. 3.

The operations may begin at block 402 with the apparatus obtaining a channel impulse response (CIR) from one or more reference signals (RSs) transmitted from one or more antennas of a base station (BS). At block 403, the apparatus may calculate an absolute square per element of the CIR to generate channel energy response (CER) elements. For certain aspects, the CER elements are obtained at a first interval if in connected mode and at a second interval if in an idle mode. At block 404, the apparatus may calculate a threshold value based on a noise variance estimated from a portion of the CER elements.

The apparatus may select CER elements that exceed the threshold value at block 406. At block 408, the apparatus may compute a reference signal received power (RSRP) value based on the selected CER elements.

According to certain aspects, the base station may be a serving base station. For certain aspects, calculating the absolute square per element of the CIR at block 403 may involve utilizing absolute square values of taps of a wideband coherently-filtered CIR. For certain aspects, the RSs may be received on a plurality of receive antennas, and obtaining the CER elements at block 402 may include summing values across transmit antennas for different receive antennas. The RSRP may be calculated in a linear scale by accumulating selected CER elements, and the RSRP may be further calculated in units of dBm from the linear scale by converting to a logarithmic scale and applying appropriate normalizations. For certain aspects, the RSRP is calculated by normalization based, at least in part, on a number of RS tones. The RSRP may be calculated by normalization based, at least in part, on a number of transmit antennas and a number of RS tones.

According to certain aspects, the operations illustrated by the blocks 400 further include computing a reference signal receive quality (RSRQ) value based on the computed RSRP. For certain aspects, the RSRQ value is computed based, at least in part, on at least one of: a number of resource blocks (RBs) in a downlink if the base station is a serving base station, and a number of RBs used for neighbor measurements if the base station is a neighbor base station.

According to certain aspects, the base station is a neighbor base station. For certain aspects, calculating the absolute square per element of the CIR at block 403 may involve utilizing absolute square values of taps of a narrowband filtered channel impulse response (CIR). For certain aspects, a noise variance estimate may be calculated for each neighbor CER for each combination of transmit and receive antenna used to yield a threshold, and neighbor CER elements above this threshold may be selected. For certain aspects, the operations illustrated by the blocks 400 may further include averaging thresholded neighbor CER elements across a plurality of transmit antennas when present. The operations may further include averaging based on a first interval if in a connected mode and averaging based on a second interval if in an idle mode. For certain aspects, the RSRP may be calculated in a linear scale by accumulating averaged and thresholded CER elements, and further calculating the RSRP in units of dBm from the linear scale by converting to a logarithmic scale and applying appropriate normalizations. The RSRP may be calculated by normalization based, at least in part, on a number of RS tones used for neighbor CER computation.

Figure 4A:
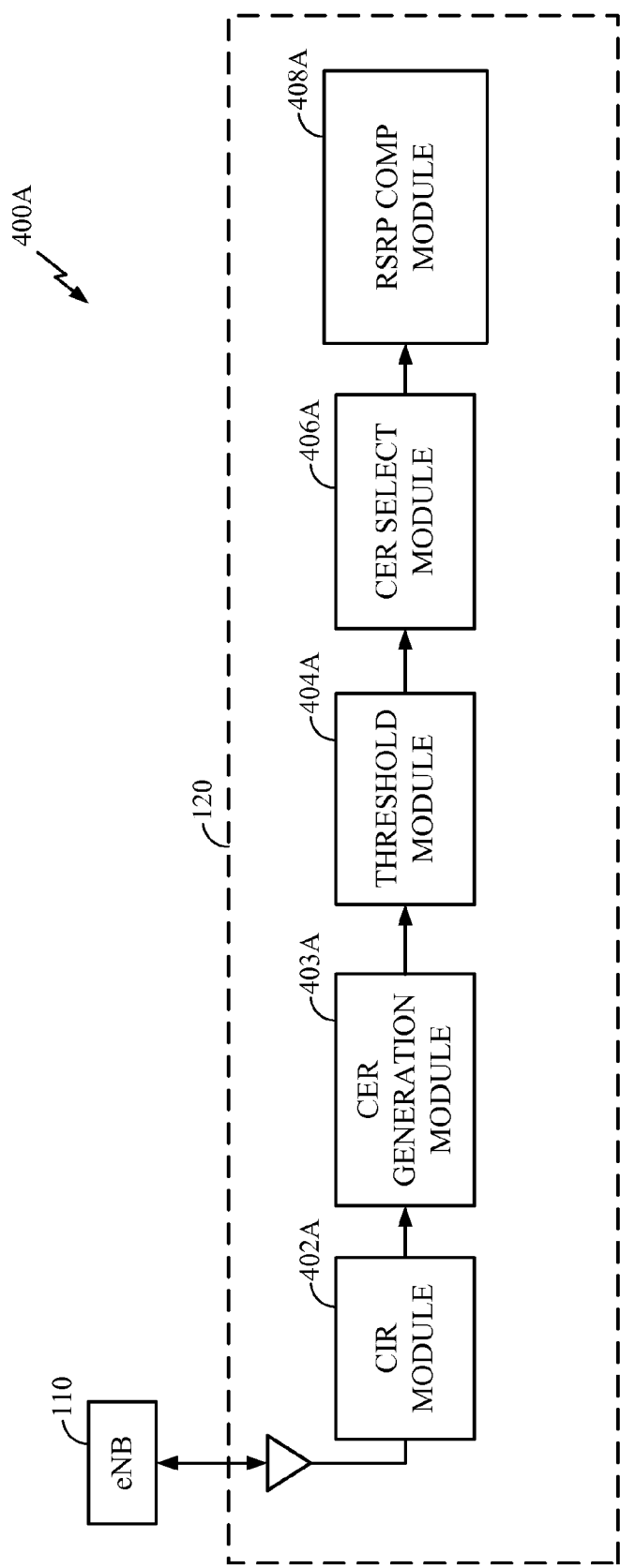
FIG. 4A illustrates example components capable of performing the operations illustrated in FIG. 4.

The operations for blocks 400 described above may be performed by any suitable components or other means capable of performing the corresponding functions of FIG. 4. For example, blocks 400 illustrated in FIG. 4 correspond to components 400A illustrated in FIG. 4A. In FIG. 4A, a CIR module 402A may obtain a channel impulse response (CIR) from one or more reference signals (RSs) transmitted from one or more antennas of a base station (BS) 110. A CER generation module 403A may calculate an absolute square per element of the CIR to generate channel energy response (CER) elements. A threshold module 404A may calculate a threshold value based on a noise variance estimated from a portion of the CER elements. A CER select module 406A may select CER elements that exceed the threshold value. An RSRP computation module 408A may compute a reference signal received power (RSRP) value based on the selected CER elements.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for processing, means for determining, means for obtaining, means for calculating, means for selecting, means for averaging, and/or means for computing may comprise a processing system, which may include at least one processor, such as the receive processor 358, the transmit processor 364, and/or the controller/processor 380 of the UE 120 illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
obtaining a channel impulse response (CIR) from one or more reference signals (RSs) transmitted from one or more antennas of a base station;
calculating an absolute square per element of the CIR to generate channel energy response (CER) elements;
calculating a threshold value based on a noise variance estimated from a portion of the CER elements;
selecting CER elements that exceed the threshold value; and
computing a reference signal received power (RSRP) value based on the selected CER elements, wherein the RSRP is computed in a linear scale by accumulating selected CER elements, and further computing the RSRP in units of dBm from the linear scale by converting to a logarithmic scale and applying normalizations based, at least in part, on a number of RS tones.

2. The method of claim 1, wherein the base station comprises a serving base station.

3. The method of claim 2, wherein obtaining the CER elements comprises utilizing absolute square values of taps of a wideband coherently-filtered channel impulse response (CIR).

4. The method of claim 2, wherein:
the RSs are received on a plurality of receive antennas; and
obtaining the CER elements comprises summing values across transmit antennas for different receive antennas.

5. The method of claim 1, wherein the RSRP is computed by normalization based, at least in part, on a number of transmit antennas and the number of RS tones.

6. The method of claim 1, further comprising:
computing a reference signal receive quality (RSRQ) value based on the computed RSRP.

7. The method of claim 6, wherein the RSRQ value is computed based, at least in part, on at least one of: a number of resource blocks (RBs) in a downlink if the base station comprises a serving base station, or a number of RBs used for neighbor measurements if the base station comprises a neighbor base station.

8. The method of claim 1, wherein the base station comprises a neighbor base station.

9. The method of claim 8, wherein obtaining the CER elements comprises utilizing absolute square values of taps of a narrowband filtered channel impulse response (CIR).

10. The method of claim 9, wherein:
a noise variance estimate is calculated for each neighbor CER for each combination of transmit and receive antenna used to yield a threshold; and
neighbor CER elements above the threshold are selected.

11. The method of claim 10, further comprising:
averaging thresholded neighbor CER elements across a plurality of transmit antennas if present.

12. The method of claim 1, wherein the RSRP is computed by normalization based, at least in part, on the number of RS tones used for neighbor CER computation.

13. An apparatus for wireless communications, comprising:
means for obtaining a channel impulse response (CIR) from one or more reference signals (RSs) transmitted from one or more antennas of a base station;
means for calculating an absolute square per element of the CIR to generate channel energy response (CER) elements;
means for calculating a threshold value based on a noise variance estimated from a portion of the CER elements;
means for selecting CER elements that exceed the threshold value; and
means for computing a reference signal received power (RSRP) value based on the selected CER elements, wherein the RSRP is computed in a linear scale by accumulating selected CER elements, and further computing RSRP in units of dBm from the linear scale by converting to a logarithmic scale and applying normalizations based, at least in part, on a number of RS tones.

14. The apparatus of claim 13, wherein the base station comprises a serving base station.

15. The apparatus of claim 14, wherein the means for obtaining the CER elements is configured to utilize absolute square values of taps of a wideband coherently-filtered channel impulse response (CIR).

16. The apparatus of claim 14, wherein:
the RSs are received on a plurality of receive antennas; and
the means for obtaining the CER elements is configured to sum values across transmit antennas for different receive antennas.

17. The apparatus of claim 13, wherein the RSRP is computed by normalization based, at least in part, on a number of transmit antennas and the number of RS tones.

18. The apparatus of claim 13, further comprising:
means for computing a reference signal receive quality (RSRQ) value based on the computed RSRP.

19. The apparatus of claim 18, wherein the RSRQ value is computed based, at least in part, on at least one of: a number of resource blocks (RBs) in a downlink if the base station comprises a serving base station, or a number of RBs used for neighbor measurements if the base station comprises a neighbor base station.

20. The apparatus of claim 13, wherein the base station comprises a neighbor base station.

21. The apparatus of claim 20, wherein the means for obtaining the CER elements is configured to utilize absolute square values of taps of a narrowband filtered channel impulse response (CIR).

22. The apparatus of claim 21, wherein:
a noise variance estimate is calculated for each neighbor CER for each combination of transmit and receive antenna used to yield a threshold; and
neighbor CER elements above the threshold are selected.

23. The apparatus of claim 22, further comprising:
means for averaging thresholded neighbor CER elements across a plurality of transmit antennas if present.

24. The apparatus of claim 13, wherein the RSRP is computed by normalization based, at least in part, on a number of RS tones used for neighbor CER computation.

25. An apparatus for wireless communications, comprising:
at least one processor configured to:
obtain a channel impulse response (CIR) from one or more reference signals (RSs) transmitted from one or more antennas of a base station;
calculate an absolute square per element of the CIR to generate channel energy response (CER) elements;
calculate a threshold value based on a noise variance estimated from a portion of the CER elements;
select CER elements that exceed the threshold value; and
compute a reference signal received power (RSRP) value based on the selected CER elements, wherein the RSRP is computed in a linear scale by accumulating selected CER elements, and further computing the RSRP in units of dBm from the linear scale by converting to a logarithmic scale and applying normalizations based, at least in part, on a number of RS tones; and a memory coupled to the at least one processor.

26. A non-transitory computer-readable medium having instructions stored thereon, the instructions executable by one or more processors for:

obtaining a channel impulse response (CIR) from one or more reference signals (RSs) transmitted from one or more antennas of a base station;

calculating an absolute square per element of the CIR to generate channel energy response (CER) elements;

calculating a threshold value based on a noise variance estimated from a portion of the CER elements;

selecting CER elements that exceed the threshold value; and computing a reference signal received power (RSRP) value based on the selected CER elements, wherein the RSRP is computed in a linear scale by accumulating selected CER elements, and further computing RSRP in units of dBm from the linear scale by converting to a logarithmic scale and applying normalizations based, at least in part, on a number of RS tones.

* * * * *